United States Patent

Schlaudroff

[15] 3,703,854

[45] Nov. 28, 1971

[54] METHOD FOR PRECISELY FORMING AND PLACING INSULATION IN THE SLOTS OF MAGNETIC CORES

[72] Inventor: Leo M. Schlaudroff, Fort Wayne, Ind.

[73] Assignee: General Electric Company

[22] Filed: May 18, 1971

[21] Appl. No.: 144,425

[52] U.S. Cl. .................93/1 G, 29/205 E, 29/596, 83/268, 83/393, 93/1 R, 93/1 WZ
[51] Int. Cl. ..........................B31d 5/02, B31f 7/00
[58] Field of Search....29/205 R, 205 E, 596; 93/1 R, 93/1 G, 1 WZ; 310/214, 215; 83/268, 391, 393, 467 A

[56] References Cited

UNITED STATES PATENTS

| | | | |
|---|---|---|---|
| 3,616,512 | 11/1971 | Appenzeller | 29/205 E |
| 3,514,836 | 6/1970 | Mason | 29/205 E |
| 3,212,380 | 10/1965 | Gobel et al. | 83/393 X |
| 1,827,740 | 10/1931 | Eaton | 29/205 E |
| 2,473,332 | 6/1949 | England | 310/215 X |
| 2,808,640 | 10/1957 | Biddison | 29/205 E |
| 2,958,122 | 11/1960 | Turk | 29/205 E |
| 2,967,346 | 1/1961 | McMaster et al. | 29/596 |
| 3,150,280 | 9/1964 | Little | 310/215 |
| 3,210,583 | 10/1965 | Profitt et al. | 310/215 |
| 3,254,394 | 6/1966 | Roberts | 29/596 |

Primary Examiner—John F. Campbell
Assistant Examiner—Carl E. Hall
Attorney—John M. Stoudt, Ralph E. Krisher, Jr., Radford M. Reams, Frank L. Neuhauser and Oscar B. Waddell

[57] ABSTRACT

Apparatus and method for accurately sizing pieces of insulation and for placing formed pieces of insulation into slots of a magnetic core. Dielectric strip material is fed to a sizing and forming station by a strip accumulating and urging device, and dielectric material pieces of preselected sizes are precisely formed. The core is precisely aligned relative to the forming member so that the insulation pieces may be inserted into a core slot which the insulation piece has been particularly formed to fit. Preferred form of apparatus includes constant force mechanisms for accurately returning strip material length determining, severing, and forming mechanisms to respective dwell positions; positive acting cams, e.g., conjugate and face cams, in selected mechanism drive trains; and positively controlled compensating means for selectively positioning a core support relative to a datum plane of the apparatus. Means in the form of relatively movable pressure bars are urged, by constant force mechanisms, toward forming devices having different sizes and shapes to form insulators there against. In another embodiment, a modified guide ring for forming and inserting devices is provided.

5 Claims, 19 Drawing Figures

PATENTED NOV 28 1972

INVENTOR.
Leo M. Schlaudroff,
BY Ralph E. Krisher Jr.
ATTORNEY.

INVENTOR.
Leo M. Schlaudroff,
BY Ralph E. Kusher Jr.
ATTORNEY.

INVENTOR.
Leo M. Schlaudroff,
BY Ralph E. Kusher Jr.
ATTORNEY.

METHOD FOR PRECISELY FORMING AND PLACING INSULATION IN THE SLOTS OF MAGNETIC CORES

CROSS REFERENCE TO RELATED APPLICATIONS

Application Ser. No. 144,426 filed of even date herewith in the name of Lowell M. Mason and assigned to the assignee of this application, is a related application. Also related is the Lowell M. Mason application Ser. No. 845,996, filed July 30, 1969, which is a division of U.S. Pat. No. 3,514,836 that issued on June 2, 1970.

BACKGROUND OF THE INVENTION

The present invention relates to apparatus and method for producing pieces of electrical insulation and for placing insulation in slots of magnetic core. More particularly, the present invention relates to an improved method and apparatus wherein insulators, such as slot liners, are precisely formed to fit one or more selected nonradially aligned or otherwise irregularly oriented core slots that are positively positioned relative to a datum plane.

The above referenced Mason patent is assigned to the assignee of the present application and discloses, inter alia, apparatus for producing insulation and placing insulation in the slots of magnetic cores.

Many problems associated with forming and placing insulators, such as slot liners, in the slots of magnetic cores and the like, are recognized and set forth in detail in the aforementioned Mason applications the entire disclosures of which are herein incorporated by reference.

As pointed out in the referenced co-pending Mason application Ser. No. 144,426, problems still remain to be resolved in connection with providing slot liners for the slots of a core wherein one or more of the slots are "nonradially" disposed. For purposes of explanation, "nonradial" slots include those slots which are not generally aligned with and/or are not generally symmetrical with respect to a radial line passing through the center of a core, and also include slots which are irregularly oriented so that simple rotation of a core about a fixed axis of rotation will not bring such slots into general alignment with a radial line passing through such axis.

The above referenced and related Mason application Ser. No. 144,426 teaches, inter alia, a noteworthy approach for providing slot insulation in nonradially disposed slots. Improved accuracy and precision in making and placing insulators in both "radial" and "nonradial" slots is, however, always desirable. Furthermore, apparatus such as an insulating machine includes various machine elements and mechanisms that must consistently and reliably operate with precision literally millions of times each year. It will be understood that under these conditions, it would be desirable to provide methods and apparatus that can provide consistently accurate apparatus operation over a long period of time, e.g., the life of a machine, which may reasonably be expected to be at least ten or more years. In addition, such methods and apparatus would desirably be attainable at a modest, if any, increase in apparatus manufacturing cost.

With the advent of irregularly oriented, e.g., nonradial, slot orientations, need has also arisen for means that would precisely form a plurality of differently sized and shaped insulators. For example, in one core configuration, nine different slot shapes must each be provided with a slot insulator uniquely tailored for such slot. It will thus be understood that it would also be desirable to provide means for precisely and consistently forming pieces of strip material to different preselected shapes. Slot complexity and variety has also necessitated the use of relatively complex elements such as guide rings.

It is, therefore, an object of the present invention to provide improved apparatus and methods for producing and placing electrical insulators in the slots of magnetic cores.

It is a more specific object of the present invention to provide improved apparatus and methods for positively and precisely positioning structural elements and mechanisms relative to one another in an insulating machine.

It is yet another object of the present invention to provide improved means and methods for consistently and accurately forming slot insulators having different sizes and shapes.

It is still another object of the present invention to reduce the complexity of various insulating machine elements and mechanisms.

SUMMARY OF THE INVENTION

In carrying out the objects of the invention, in one form thereof, I provide an arrangement for placing electrical insulators (for example, slot liners) in the slots of a magnetic core.

The illustrated apparatus includes a material feed station for supplying preselected quantities of strip material to a material accumulating and urging station. Located adjacent the accumulating and urging station is a sizing and forming station wherein preselected lengths of material are advanced, preselected lengths of material are severed, and the severed pieces are formed to generally correspond to a preselected slot in which the strip material is to be disposed. In a preferred exemplification, constant force mechanisms are utilized to positively control the precise movement of structural elements and mechanisms relative to one another and thus insure the accurate formation and placement of the preselected lengths of material over a long period of time. These mechanisms assure that a preselected length of strip material is accurately determined and severed from a supply of strip material. These mechanisms also assure that a formed insulator is positively controlled while being handled and placed in a core slot.

Also disclosed is a slotted core supported near a guide ring that, in one form, is of reduced complexity. A mandrel supports the core adjacent the sizing and forming station, and alignment means index the stator core radially about a central axis and preselectively shift such central axis relative to a datum plane of the apparatus. The illustrated exemplification includes positive action position determining control means that include surface cams that reliably and accurately shift the central axis in a preselected or programmed manner during indexes of the apparatus.

Means are also provided, in the form of inner and outer pressure members or bars, that are movable relative to each other. These bars are also movably supported by a carriage in the form of a pair of side plates, and cooperate with forming tools having different sizes and shapes, to precisely form slot insulators. The pressure bars are continuously urged toward the forming tools with a predetermined force by constant force applying means. Improved strip material accumulating means are also provided for accommodating material of differing stiffness.

The exemplified apparatus and method are extremely versatile in application and are easily modified to take into consideration different modes and speeds of operation. The exemplified apparatus also may be adapted quickly, with a minimum loss of machine operating time, to operate at different speeds and to handle cores having different slot configurations or diameters.

Utilization of the constant force means in a preferred form, provides a mode of applying forces to apparatus mechanisms that are not dependent on the displacement of such apparatus mechanisms. In addition, the amount of such force may be readily adjusted for optimum apparatus operation.

The subject matter which I regard as my invention is set forth in the appended claims. The invention, itself, however, along with further objects and advantages thereof will be understood by referring to the accompanying description taken in connection with the drawings.

BRIEF DESCRIPTION OF THE DRAWINGS

FIGS. 13 through 19 are schematic representations of selected portions of the apparatus shown in FIG. 12 and portions of a slotted core; and are presented to illustrate the compensated alignment of a selected core slot with an apparatus datum plane and, more specifically;

DESCRIPTION OF THE PREFERRED EMBODIMENTS

Turning now to a consideration of the drawings in more detail, FIGS. 4, 12, and 1 through 3 inclusive are helpful in initially discussing the practice of a preferred method in one form as it may be practiced by the exemplified apparatus.

Figure 2:
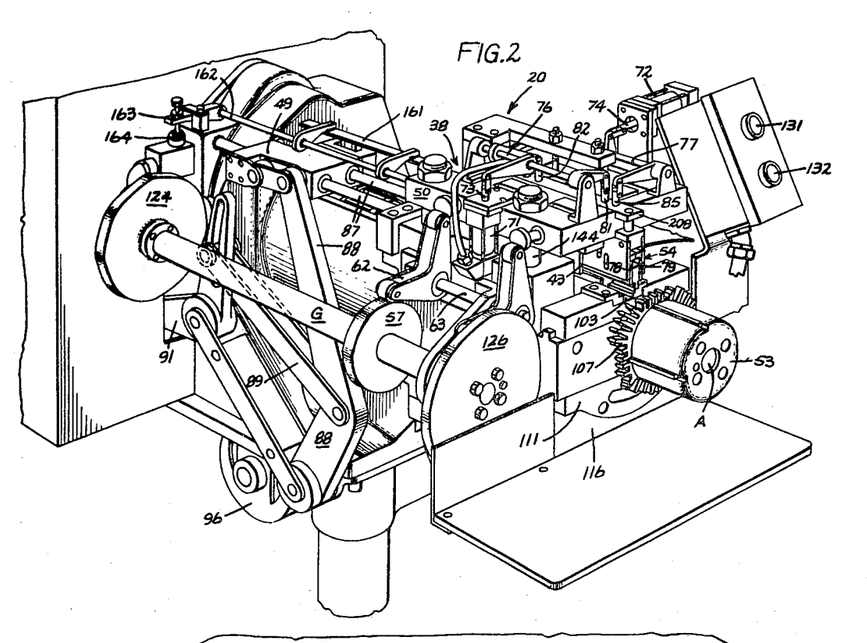
FIG. 2 is a partial front perspective view of apparatus, including the structure of FIG. 1, embodying and adapted to practice the present invention.
Figure 4:
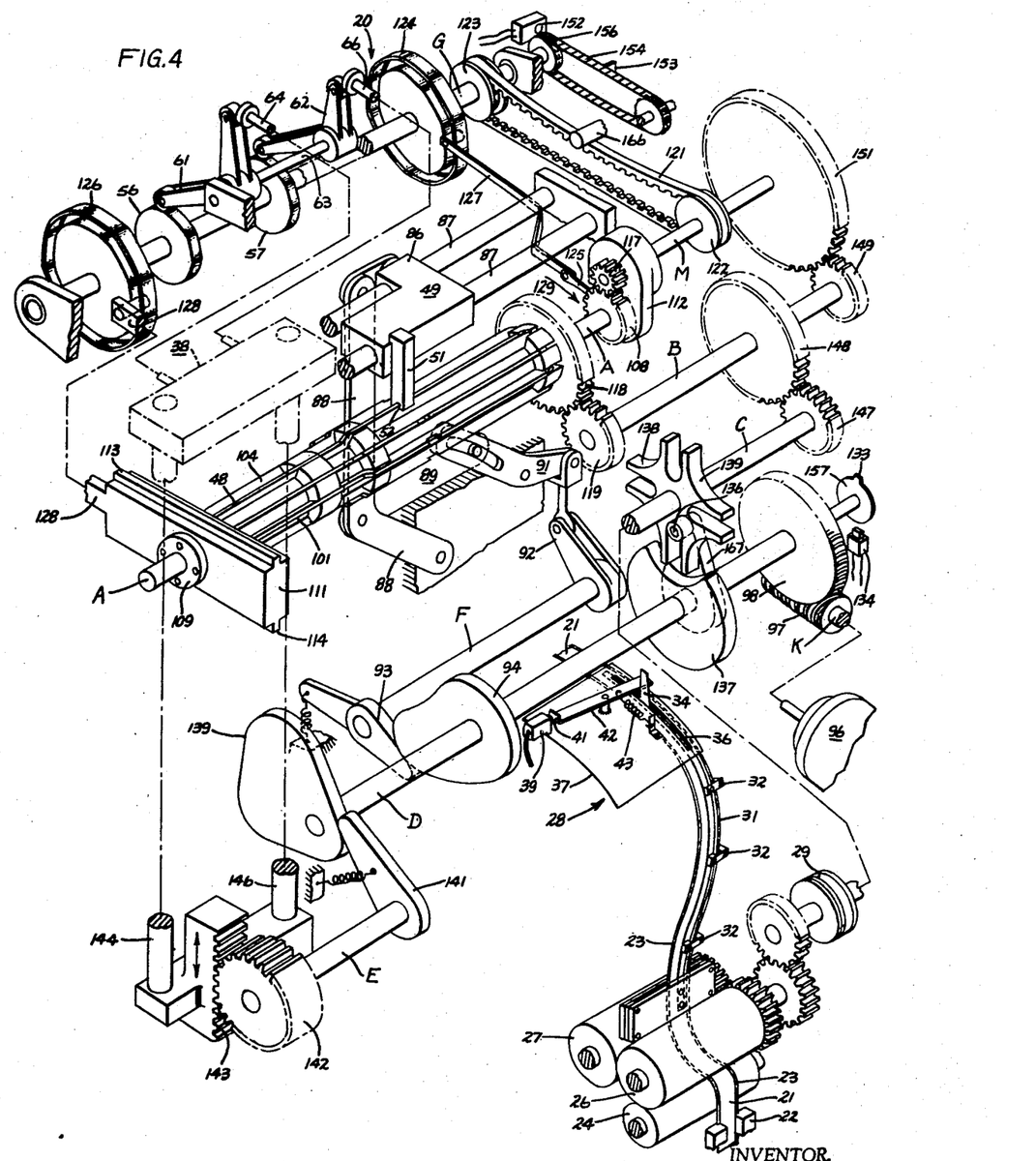
FIG. 4 is a schematic perspective view of a portion of the apparatus shown in FIG. 2.
Figure 12:
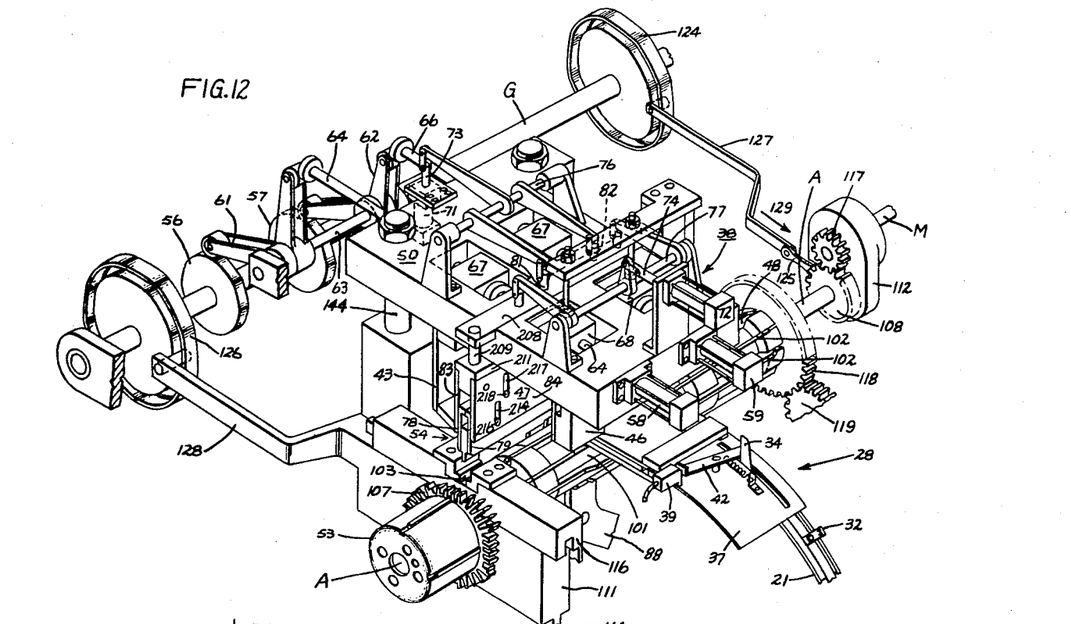
FIG. 12 is an exploded schematic perspective view, with parts removed, of a portion of the apparatus shown in FIG. 1.

With particular references to FIGS. 2, 4, and 12, a preferred form of apparatus is denoted by the reference numeral 20. During operation of the apparatus, a supply of strip material 21 is fed from a not shown storage or supply station by a feeding mechanism. As illustrated, this mechanism includes a folding block 22 that is operable to fold one or both edges of the strip material as shown at 23. These folded edges will, as described hereinafter, provide cuffs for slot liners or insulators that are subsequently formed from the strip of material. The feeding mechanism also includes an idler roller 24 that presses the folding strip against a surface of the driven roller 26. The roller 26, with driven pinch roller 27, feeds the strip material to a strip accumulating station 28.

Power is supplied to the driven rollers 26, 27 through a selectively energizeable electromagnetic clutch 29 from a driven shaft within the apparatus as will be described hereinafter in more detail.

The feeding step includes supplying a predetermined quantity of strip material to a strip accumulating and urging or feeding device at the material feed station 28. The feeding device includes a leaf spring assembly 31 comprised of a plurality of leaf springs, held together by clamps 32. The actual number of leaf spring utilized may be selectively varied to vary the stiffness of the assembly. This assembly also includes a signal arm 34 movable in a slot 36 formed in a guide plate 37. As strip material is urged into the sizing and forming station 38 (best shown in FIG. 12), the signal arm 34 causes a sensing means to energize and thus engage the clutch 29. As strip material is then accumulated, as described in more detail in the referenced Mason patent, the signal arm 34 backs up in the slot 36 and the clutch 29 is deenergized by the sensing means.

Although the sensing means may include a photo-cell or mechanical limit switch arrangement, it has been illustrated as including a conventional proximity switch 39. With the illustrated arrangement, clutch 29 is energized only while the metal flag 41 on the end of pivot arm 42 is held adjacent thereto (against the action of tension spring 43) by the signal arm 34.

A portion of the preselected quantity of strip material 21 is urged towards a preselectively movable stop plate 43 (best seen in FIG. 12) and, as taught in the referenced Mason patent, the strip material tends to cock or rotate the leaf spring assembly away from the stop plate 43. Strip pieces, for example, the piece 44 shown in FIG. 11, are then formed as a cutting blade carried in cutting head 46 severs the strip material, and forming means 54 shown as a forming mechanism 47 forms the severed strip piece against a forming and insertion blade 48. Operation of the mechanism 47 will be later described in more detail in connection with FIGS. 8–10.

After the strip pieces are formed, the forming and insertion tool or blade 48 is moved axially of the apparatus 20 by a blade driver 49 having a lug 51 engaged in a drive slot 52 formed in the blade 48.

Successively formed individual strip pieces, of different sizes and shapes, are then transferred into or placed in preselected slots of a core disposed on a core support, e.g., core support 53, by successive ones of the forming and placing tools. As a forming tool such as tool 48 moves a formed strip piece or slot liner into a preselected slot of a core, the strip piece is retained on the tool by holding means that may include pressure bar 78, or bar 78 and one or both of pressure bars 79, 80 best shown in FIGS. 8–10.

As the accumulating and feeding device urges the strip material 21 into engagement with the stop plate 43 in the apparatus 20, the preselected length of the piece of strip material that is severed is determined by the accurate positioning of the stop plate 43 and the cutting blade. In the apparatus 20, the positions of the plate and blade are very accurately controlled by the plate cams 56, 57, respectively, and constant force mechanisms that are embodied in the apparatus 20 as pneumatic cylinders 58, 59. The plate cams drive, through cam follower linkages 61, 62 on a shaft 63, plungers 64, 66. These plungers are connected to a pair of adjusting yokes or blocks 67, 68 respectively, and adjust the positions of stop plate 43 and severing blade head 46 respectively. In order to precisely and consistently preselectively position both the stop plate and the cutter head, and particularly so at extremely high operational speeds and after literally millions of machine cycles, the plungers 64, 66 bear against the pistons of cylinders 58, 59. By this means, the plungers are urged against the follower linkages 61, 62. This, the follower linkages 61, 62 are urged against the cams 56, 57 with a force that is substantially constant regardless of the position of the plungers 64, 66.

The pressure of air supplied to the cylinders 58, 59 may be varied by control valve 69 interposed in air supply line 711 between the cylinders and air tank 75 which in turn is connected to a source of air pressure. It will be understood that this constant force, regardless of displacement, operational arrangement is distinguishable from arrangements wherein a simple spring, such as a coil spring, have been utilized in that the restoring force of a compressed spring is a function of the difference between the free length and compressed length of that spring. Furthermore, the "stiffness" of the cylinders may be readily changed by setting the valve 69. This in turn permits simple and straightforward adjustment, even during machine operation, in order to optimize the performance of the apparatus 20. In addition, benefits in reliability of the apparatus 20 will be realized since, even after millions of operational cycles, when it would be expected to be necessary to replace coil or other conventional spring members, the cylinders should still be maintenance free. I have also provided constant force mechanisms in the form of cylinders 71 and 72 which operate through pushrods 73, 74 and rocker linkages 76, 77 to respectively provide constant, once adjusted, holding forces for the forming and holding means 54. This means 54 includes the pressure bars 78, 79, 80 previously mentioned. The bar 78 is biased by two plungers 81, 82 secured to the rocker assembly 76, while bars 79, 80 are biased, from rocker assembly 77, by two plungers 85, 90 as will be more apparent from FIG. 8.

With this arrangement, when a forming blade or tool having a relatively large concave upper surface or surface is utilized for forming a slot liner, the independently biased bars 78, 79, 80 will cooperate to hold and form the liner against the upper portion of the blade and the side plates 83, 84 will form the ends of the liner against the blade. On the other hand, when a forming tool having a relatively narrow upper face is moved into forming position, the pressure bar 78 will hold the strip material against the top face of the narrow forming tool, while the other bars 79 and 80 will form the legs of the slot liner down against the generally vertically disposed face of the narrow forming blade. A more detailed description of this procedure is presented below in connection with the description of FIGS. 8–10.

The inserting mechanism 49 includes a carriage 86 movable between front and rear positions on guides 87. The carriage is intermittently driven by means of a linkage 88 driven through links 89 and 91 by a crank arm and linkage 92 on shaft F. This shaft is driven through follower 93 by a face cam 94 or pair of conjugate cams connected to a master or drive shaft D which is continuously driven by a drive motor 96 acting through an output shaft K, worm gear 97, and spur gear 98.

The carriage 86 includes a connecting block or leg 51 engated in a slot of a forming tool such as slot 52 in tool 48. When the carriage 86 is moved forward, it will drive the forming tool 48 forward along a datum plane of the apparatus 20 into a preselected slot of a magnetic core carried by the core support 53 which is provided with suitable frictional retaining means for retaining a slotted core thereon.

As the carriage 86 moves from its rear position to its forward position in response to actuation by the master control shaft D, a slot liner, formed from the piece of electrically insulating strip material 21 will be carried into a core slot aligned with the apparatus datum plane while one or both of the pressure bars 78, 79 retain the slot liner on the forming blade. Thus, it will be understood that shaped liners may be inserted directly into a preselected slot of a magnetic core, after the slot has been aligned with the apparatus datum plane (and therefore a forming tool), so as to reduce the possibility of a slot liner being improperly positioned in a core slot due to a twisting action or the like.

The foregoing brief description of one preferred form of apparatus, taken in conjunction with the drawings, it will be appreciated that the operating stations of the apparatus 20 are each controlled through the master control or drive shaft D, and that each therefore operate in synchronism for developing slot liners in the axially extending slots of a magnetic device such as a stator core.

While the mechanisms at each of these stations have been fully described above, a further explanation of the synchronizing function or operation of the master control shaft D as well as of the mechanisms at each station is presented below. For ease of understanding, it should also, however, be appreciated that the foregoing description in many respects parallels the description presented in the referenced Mason patent and related Mason application. This parallel description has been provided primarily to promote clarity of description and usage of terminology as consistent as possible with that used by Mason.

With particular reference now to FIGS. 1, 4, 5, and 12, the step-by-step procedures of aligning nonradial slots in the core 100 with a datum plane of the apparatus 20 and with a preselected forming blade aligned with such plane will now be described in more detail although essentially the same description is contained in the referenced Mason application.

The stator core 100 includes 36 slots. It will be appreciated that the corresponding slots in each quadrant of the core are substantially identical to each other. Thus, the core may be described as being provided with a group of similar slots in each quadrant with each group comprising nine different slots. For ease of description, only the nine slots in one quadrant of the core 100 have been identified as slots S1 through S9 in FIG. 5, but it will be appreciated that the following discussion and description would pertain to a discussion of the other slots as well. Furthermore, it will be understood that the core 100 has been selected for illustration for purposes of exemplification and discussion only, and that the apparatus 20 including the cylinders 58, 59, 71, 72 and forming means 54 have been selected for the same reasons.

Thus, the invention exemplified throughout the present application may be utilized in connection with radially or nonradially slotted cores having more or less than 36 slots, any core of which may have substantially only one slot configuration throughout, a slot configuration where every slot is different, or repeating series of slots.

Figure 5:
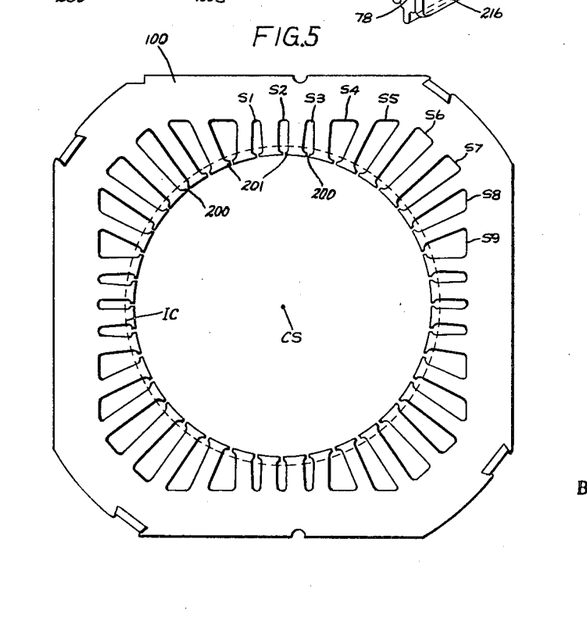
FIG. 5 is an enlarged view of a magnetic core.

Assume first that the core 100 were to be merely indexed angularly in equal increments of 10 degrees by the apparatus 20 about an axis extending along the center $C_S$ of the bore starting from slot S2. In this case, it will be appreciated that even though a slot such as slot S6 or slot S7 would be approximately radially disposed relative to the center of the bore so that a slot liner could be inserted therein by one of the inserting tools, the nonradially disposed slots, including slots S1 and S3 would be so skewed relative to the datum plane of the apparatus that an inserting tool would impinge on the face of the core and not be able to place a strip of material therein.

This will be better understood by again referring to FIGS. 12 and 4 and noting that the tool supporting tube 101 is intermittently rotated about a fixed axis during operation of the apparatus 20.

During each dwell of the tooling tube 101, while an insulator is being formed and placed, one of the tools, generically identified by the numeral 102, will be positioned in alignment with the tool guide channel 103 and the apparatus datum plane which (for purposes of this discussion) is a vertical plane through the apparatus 20 in which the rotational axis of tube 101 is disposed.

As taught in the related Mason application, interference is avoided between the core 100 and the blades; and slot S1 is aligned, with a selected one of the blades and with the datum plane DP.

Figures 17, 19:
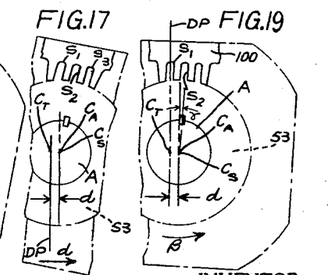
FIGS. 18 and 19 illustrate the final positions of the FIG. 13 and 14 structures.
Figure 18:
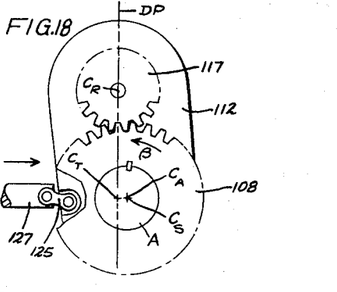

As is also taught in the related Mason application, the steps by which this desirable result is accomplished may be described, starting from an assumed initial position wherein slot S2 and the blade for insertion of a slot liner therein are aligned with a datum plane DP, as including: angularly indexing or moving the tooling tube 101 through a fixed increment of travel (for example, rotate the tube 101 about axis $C_T$ an angular increment of 40 degrees, this being determined by: (360°/9 blades) = 40°/blade); angularly indexing or moving the core a total or resultant differential increment of travel, preselected for each particular slot (for example, rotate the core 100 about axis $C_S$ a preselected correction differential angular increment of angle $\beta$ as shown in FIG. 18); and compensating for the misalignment of the slot S1 relative to the datum plane. The compensating step may be accomplished as indicated in FIGS. 17 and 19, by translating, e.g., shifting the axis or center $C_S$ relative to the datum plane a distance $d$ preselected for each slot.

As will now be appreciated, these steps may be practiced sequentially or substantially simultaneously. However, whether practiced sequentially or within the same time interval, the indexing of the core through the resultant differential angle may be accomplished (in the index from slot S2 to S1) by simply rotating the core through the angle $\gamma$ as represented in FIG. 19; or by first rotating the core 100 through a fixed angular increment $\alpha$ equal to 10 degrees (determined by dividing 360 degrees by the number of slots in the core 100, i.e., 36), and then rotating the core through a preselected angle $\beta$ (as shown in FIG. 18) so that the resultant differential displacement of core 100 will be equal to the preselected angle $\gamma$. For a more detailed description of the foregoing, reference should be made to the related Mason application.

In the embodiment illustrated herein, the tooling tube index, core index, and core shift are all accomplished during the same time interval. Furthermore, means are provided that substantially simultaneously shift the core axis or center $C_S$ the preselected distance $d$ and tend to rotate the core about the axis $C_S$ through the angle $\beta$ (preselected for each index) while other means tend to rotate the core about the axis $C_S$ through a fixed angle $\alpha$ so that the core is actually rotated through the differential angle $\gamma$ which is the vector sum of the angles $\alpha$ and $\beta$.

For completeness of description, one means by which this is accomplished will now be described in detail in connection with FIGS. 12–19 and 4. For this purpose, reference is now made (see FIG. 12) to the core supporting mandrel 53 and a guide ring or spider 107 which are secured for rotational indexing movement to the mandrel shaft A. The shaft A has a gear 108 affixed to one end thereof and is supported at that end by a bearing carried by the rocker arm 112. The other end of shaft A is supported by a bearing 109 secured to the compensating block 111. The rocker arm 112 is supported on a bearing for rotation about the axis of a drive shaft M, and thus, the gear end of shaft A may rotate about the axis $C_A$ of the shaft and also rock about the shaft M. The mandrel end of shaft A, however, may rotate in bearing 109 and also shift in a direction perpendicular to the datum plane with the guides 113, 114 on the compensating block 111 sliding along the guide block 116.

Programmed rotation of the shaft A (and, accordingly, the mandrel, spider, and core when supported on the mandrel) is accomplished by the pinion 117 secured to shaft M. During one index, the pinion 117 tends to drive gear 108 through 10 degrees of rotation and during this same time period, the tooling support tube 101 is indexed through 40 degrees of rotation by means of gear 118 affixed thereto which in turn is driven by gear 119.

With reference to FIG. 4, as the gear 108 is driven by the shaft M, a timing belt 121, driven by sheave 122 on shaft M, rotates sheave 123 and thus cam drive shaft G. Shaft G then drives plate cams 56, 57 and surface cams 124, 126. The cams 124, 126 through cam follower linkages 127, 128, rock the rocker arm 112 and shift the compensating block 111 preselected amounts as determined by the contours of the cams 124, 126. The cams 124, 126 each are provided with nine dwell regions, so that as each of the nine different slots in a quadrant of the core 100 are indexed toward alignment with the datum plane, the cams shift from one dwell region to another and preselectively shift the block 111 and rock the arm 112. This, of course, results in the shaft A being displaced within the hollow tube 101. During each index of the cams 124, 126, the shaft G rotates 40 degrees. Positive control of the rocker arm 112 in the exemplification is accomplished by connecting the linkage 127 to the rocker arm 112 with a link 125.

Although it would be necessary, in some applications, to provide different cam contours for cams 124, 126, I have found that for the application of which core 100 is representative, it is possible to provide the cams 124, 126 with substantially identical camming surfaces. Thus, for arrangements where common cam action is permissible, it will be understood that I could replace the cams 124, 126 with a single cam that would drive cam follower linkages 127, 128.

As previously mentioned, the pinion 117 tends to drive gear 108 (and thus shaft A) through 10 degrees during an index period. However, the rocking movement of the gear end of shaft A causes the gear 108 to tend to rotate around the pinion 117. The degree of this rotation of gear 108 relative to pinion 117 corresponds to the angle $\beta$ in the preceeding discussion of FIGS. 13–19, and the angle $\beta$ is either additive or subtractive relative to the angle $\alpha$, depending on the direction of movement of the linkage 127 as it is moved from one dwell position to another of cam 124.

In order for the angle $\beta$ to be subtractive from the angle $\alpha$, (assuming clockwise rotation of shaft A, looking into FIG. 17), the linkage 127 will be moved in the direction of the arrow 129. On the other hand, when linkage 127 pulls the rocker arm 112 in a direction opposite of that indicated by arrow 129, the angle $\beta$ will be additive to the angle $\alpha$. In either case, the vector sum of angles $\alpha$ and $\beta$ will be the differential or resultant angle $\gamma$, through which the mandrel end of shaft A will be actually rotated.

It will now be understood that the mandrel end of shaft A, supported by the bearing 109 and compensating block 111 will both rotate through the differential angle $\gamma$ and be translated a distance $d$ (see FIG. 19) by the action of cam 126. In addition, this all occurs while the tube 101, carrying the tool blades 102 is rotated 40 degrees about the center line of tube 101 which remains fixed in the datum plane of apparatus 20.

It will now be understood that FIGS. 13 through 19 have been drawn to illustrate the relative positions of the rocker arm 112, pinion 117, and gear 108; as well as a segment of the core 100 and centers $C_A$, $C_T$, $C_S$ during the index period while slot S2 is being indexed away from the datum plane DP and slot S1 is being indexed into alignment with the datum plane. The centers $C_A$, $C_T$, and $C_S$ are the centers or center lines of the shaft A, tube 101, and stator core 100, respectively.

Figure 13:
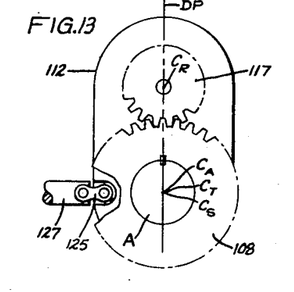
FIGS. 13 and 14 illustrate an initial position of a core support shaft and core, respectively.
Figure 14:
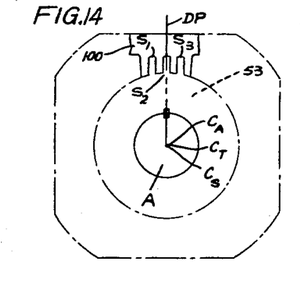

Looking first at FIGS. 13 and 14, the centers or center lines $C_A$, $C_T$, and $C_S$ of the mandrel shaft A, tooling tube 101, and stator core 100 are all generally coincident and lie in the datum plane DP during the time that the slot S2 is being provided with a strip of insulating material. Then, after the insertion tool used for inserting the strip material into slot S2 has returned to its dwell or home position, the apparatus 20 undergoes a mandrel index cycle and the tooling tube 101 is indexed so that the next successive tooling blade to be used in connection with the formation and insertion of a strip of insulating material in the nonradially disposed slot S1 is brought into alignment with the datum plane DP. During this same time period, the mandrel 53 is rotated and shifted to bring the slot S1 into generally symmetrical alignment with the datum plane DP and thus into accurate alignment with the tooling blade to be used therewith. Thereupon, the tooling tube 101, mandrel shaft A, mandrel 53, stator 100, and rocker arm 112 dwell as a strip of insulating material is fed and advanced into the head of the apparatus 20, and cut to a preselected length as the cutting blade is pulled downwardly by the pull rods as set forth in the referenced Mason application Ser. No. 845,996.

Figure 7:
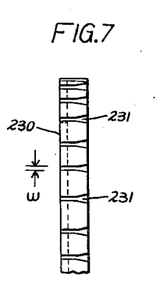
FIG. 7 is a side elevational view of the structure shown in FIG. 6.
Figure 8:
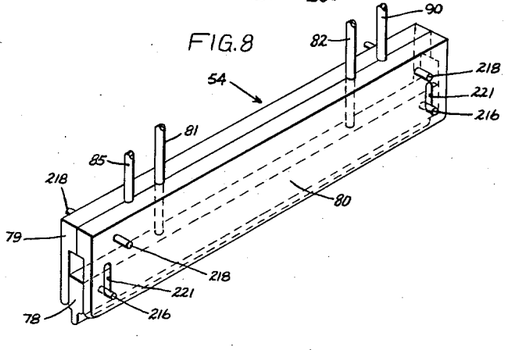
FIG. 8 is a perspective view, with parts removed, of a portion of the apparatus shown in FIG. 1.
Figure 15:
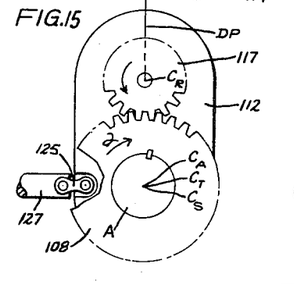
FIGS. 15, 16, and 17 illustrate intermediate positions of the structure shown in FIGS. 13 and 14.
Figure 16:
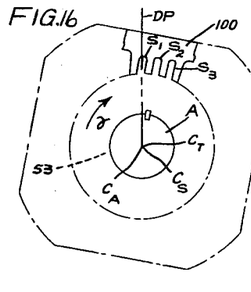

After a slot liner is inserted into slot S2, the pinion 117 drives (or tends to drive) the mandrel 53 and gear 108 through the angle $\alpha$ as shown in FIGS. 15 and 16. At this same time, the linkage 127 rocks the rocker arm 112 and compensating block 111 (under the influence of linkage 128) moves the mandrel 53 a compensating distance $d$ as shown in FIG. 17. However, the movement of rocker arm 112 about the axis $C_R$ of shaft M moves the gear 108 relative to pinion 117 so that gear 108 tends to rotate through the angle $\beta$. The final position of these parts is shown in FIGS. 7 and 8 wherein the slot S1 is aligned with the datum plane DP, and the core 100 has been translated a distance d and rotated through the differential angle $\gamma$.

Having the foregoing in mind, it will now be appreciated that the apparatus 20 is provided with a drive train which accomplishes at appropriate times during a complete machine cycle (a complete machine cycle being one in which all of the slots of a given stator core have been provided with insulation as determined by the operator of the apparatus) a desired compensated indexing of a core having nonradial slots formed therein. It should be noted at this time that it is preferred, for the reasons set forth in detail in Mason application Ser. No. 144,426, that the pitch diameter of gear 108 be approximately the same as the diameter of an imaginary circle IC on the core to be supported on the mandrel 53. This circle IC is shown in FIG. 5 by a broken line and is of a diameter sufficiently larger than the bore of the stator that it lies just radially beyond the restricted slot entrances 200 defined by the tooth tips 201.

Now having reference to FIGS. 1, 2, 4 and 12, it will be understood that one complete operational sequence of the apparatus 20 will be accomplished when an operator places a core on mandrel 53 and pushes the start button 131. When button 131 is actuated, control means (as described, for example, in the Mason application Ser. No. 845,996) will cause the apparatus 20 to operate continually until a stator core has been provided with the desired number of strips of insulative material. The relative positioning of some of the shafts and gears which make up part of the drive train for the apparatus 20 are clearly revealed in FIG. 3, but a complete operational cycle of apparatus 20 will be best appreciated by referring again to FIG. 4.

As previously stated, power is supplied to the apparatus 20 from the motor 96 through shaft K to the worm 97 which drives worm gear 98 keyed to main drive shaft D. Also keyed to shaft D is a flag 133 to be utilized in connection with the proximity sensor 134 as will be described in more detail hereinafter.

A Geneva cam roller 136 and locking cam 137 on shaft D intermesh with a Geneva cam 138 secured to shaft C so that shaft C will rotate 90 degrees for every 360 degrees rotation of shaft D. During the time that the Geneva cam roller 136 is interfitted with a follower slot on the Geneva cam 138, the cam 138 is driven and accordingly shaft C will rotate. However, as the cam roller 136 emerges from a cam follower slot, the locking portion 137 of the Geneva driver will mesh with the locking surfaces 139 on the Geneva cam and prevent any additional rotation of the shaft C until such time as the Geneva cam roller 136 reengages a cam follower slot on the cam 138. Also keyed to shaft D are a pair of cams 94 and 139. Although in actual practice, these cams are preferably conjugate cams, they have been schematically illustrated as simple cams.

The cam 94, as previously explained, imparts motion through follower 93 to the linkage 91, 89, 88 so that during each revolution of the shaft D one of the insertion tools on tube 101 is advanced and retracted.

The cam 139, during each revolution of the shaft D, oscillates shaft E through the action of follower 141. The pinion 142, secured to shaft E, moves rack 143 downwardly from a dwell position; and through pull rods 144, 146, the rack 143 lowers the severing and forming means carried by the head 38 which are shown most clearly in FIGS. 8 through 10. After being driven downwardly, the rack 144 is returned vertically upwardly and dwells during the remainder of a revolution of shaft D, as will be understood.

As the shaft C is rotated, it supplies power to clutch 29 and also drives shaft B by the engagement of gear 147 with gear 148 on shaft B. For each 90 degree revolution of shaft C, shaft B turns through an angle of 60 degrees. Gears 119 and 149 on shaft B then respectively drive the gears 118 and 151 so that the shaft M is rotated through angle of 20 degrees while the tooling tube (connected to the gear 118) is rotated through an angle of 40 degrees. The shaft M, through timing belt pulley 122, drives the timing belt pulley 123 and cam shaft G through an angle of 40 degrees, whereas the pinion gear 117 secured to the shaft M tends to drive the mandrel shaft A through approximately 10 degrees of rotation as previously explained.

The cams 124 and 126 are, as noted, substantially identical and each provided with nine dwell portions. During operation of the apparatus, the followers 127 and 128 are driven from one dwell position to another during a mandrel index cycle. The cams 56 and 57 are also provided with nine dwell regions and through the cam follower linkages 61, 62 respectively operate the plungers 64, 66 in order to adjust the stop plate and severing means as previously described.

Comparing now FIG. 17 with the configuration of the stator shown in FIG. 5, it will be understood that the mandrel 53 is secured to shaft A and particularly adapted to support the core 100. Furthermore, since the center $C_4$ of the mandrel will be in the datum plane DP while the slots S2 in each quadrant of the core 100 are aligned with the datum plane, and the slots S2 in each successive core quadrant are spaced 90 degrees apart, the mandrel and core will undergo 90 degrees of rotation while the nine blade supporting tooling tube 101 and cam shaft G will move through one complete revolution. Of course, during each index of mandrel movement within the total 90 degree mandrel displacement just referred to, the mandrel will rotate through 10 degrees plus or minus a predetermined angle that is preselected to bring the next successive core slot into alignment with the datum plane.

Then, after one complete revolution of mandrel shaft A at the end of which time the compensating block 111 will have returned the mandrel center line to the datum plane, the shaft A will have turned 360 degrees, the cam shaft G will have rotated through 1,440 degrees, and the apparatus will have completed one machine cycle and stop so that an insulated core may be removed from the mandrel 53 and another core placed on the mandrel in preparation for the operation of another machine cycle.

The apparatus 20 is automatically stopped or declutched by means of sensing means that are illustrated as including the pair of series connected proximity sensors 134, 152. The proximity sensor 152 senses a flag 153 carried by a timing chain 154 driven through a sprocket 156 carried on an extension of the cam shaft G. On the other hand, proximity sensor 134 is energized by the flag 133 carried on the disc 157 which is secured to an extension of the main drive shaft D. It will be understood that even though the proximity sensor 21 is energized once during each revolution of the main drive shaft D, the apparatus 20 will not be declutched by a not shown clutch on shaft K until such time as the sensors 134 and 152 substantially simultaneously sense the presence of the flags 133, 153, respectively. This provision of series connected sensing means, arranged as illustrated provides a built-in mechanical system that, without expensive electronic counters, will stop the apparatus after the shaft G has turned through a preselected number of degrees, e.g., four revolutions in the exemplification. As will be understood, any suitable means may be used to energize and deenergize or clutch or declutch the apparatus 20 from the drive motor. Then, when the clutch on shaft K is disengaged (either on signal from the sensors 134, 152 or upon depression of stop button 132 shown in FIG. 2), a magnetic brake may be utilized to substantially instantaneously stop the drive shafts K and D.

Figure 1:
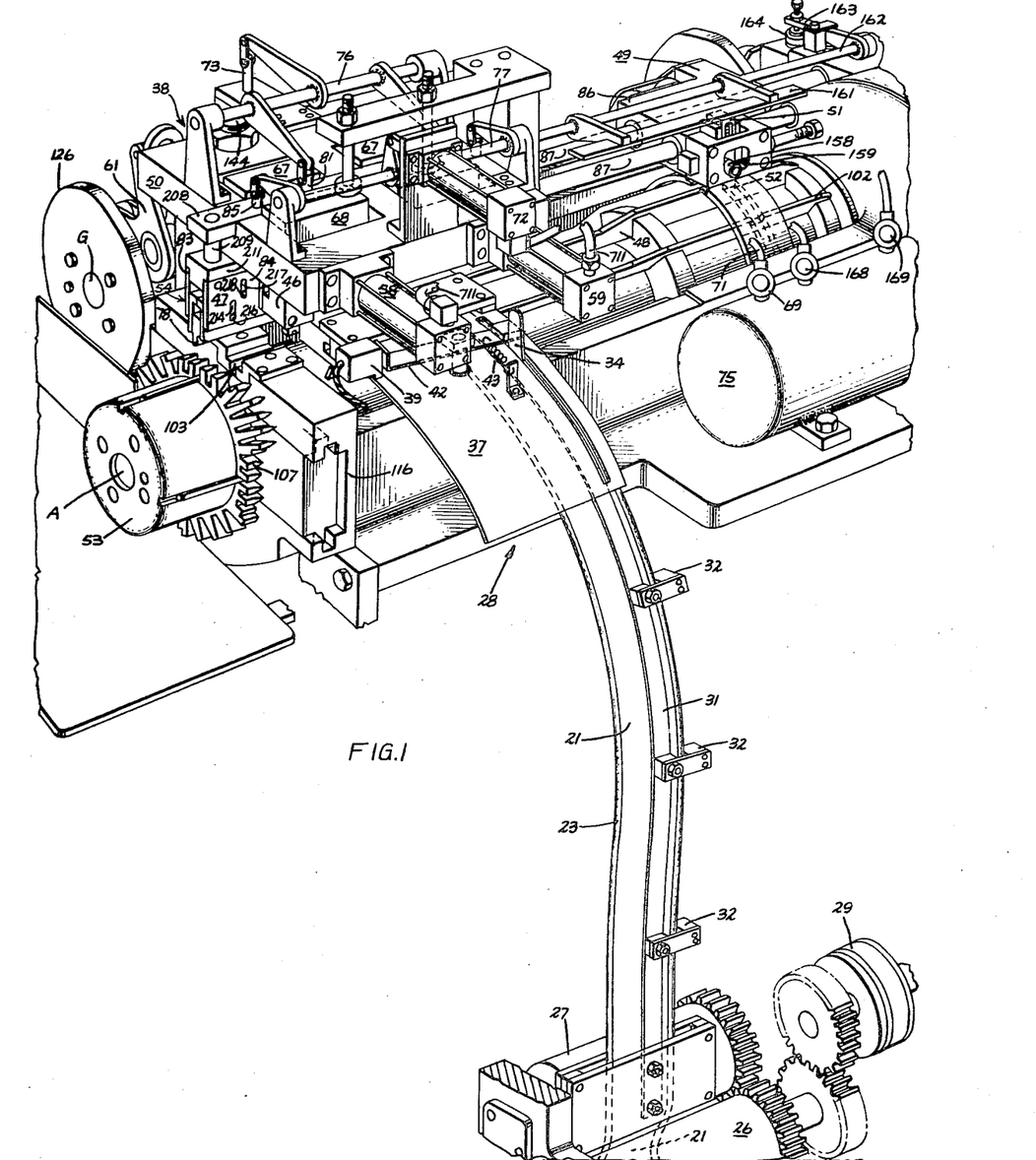
FIG. 1 is an enlarged perspective view, with parts removed, of a portion of an apparatus embodying and adapted to practice the present invention.

Further details of the tooling blade driving block 49 will now be presented with reference being made to FIGS. 1, 2, and 4. In these figures, the same reference numerals refer to identical parts although some of the parts are illustrated realistically in one figure and schematically in another figure. As the driving block 49 advances along the guides 87, an inserting blade 102 will be advanced toward the spider 107 and core supported by a mandrel on shaft A. In the event that the inserting blade encounters an obstruction in a core slot or in the event that the spider or supported core is not properly aligned with the datum plane, the apparatus 20 will be deenergized and stop. This function is provided by the movement of driving pin 158 (affixed to driving arm 51) rearwardly and upwardly relative to the slot 159. The upward movement of pin 158 disengages the arm 51 from a drive slot 52 in a tooling blade and also causes the arm 51 to engage the stop bar 161 carried by shaft 162. This then causes shaft 162 to rotate slightly and, through arm 163, touch and open emergency stop switch 164.

Figure 3:
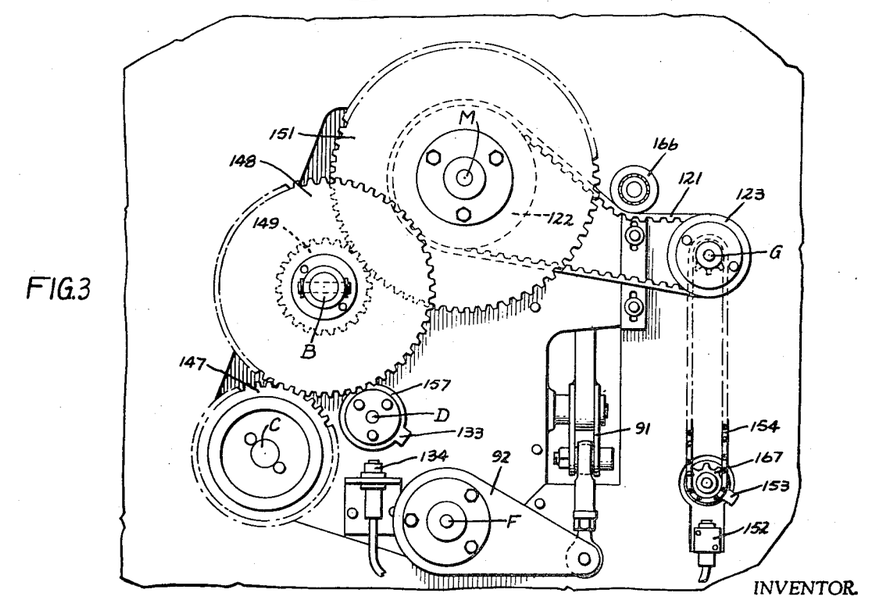
FIG. 3 is a rear view, with parts removed, of the apparatus shown in FIG. 2.

Turning now to FIG. 3, there is revealed a rear view of the apparatus 20. From this view, the location and relationships of various ones of the shafts F, C, D, B, M, G, and related parts will be understood. In addition, the positions of the proximity detectors 134, 152, a tensioning idler wheel 166 for belt 121, and return sprocket 167 for chain 154 are clearly illustrated.

In view of the foregoing, it will be appreciated that the obstruction stop mechanism, stop plate 43, forming tools 102 and drive therefor, and severing mechanism 46 are quite similar, if not identical, to those corresponding parts described in the referenced Mason application 03-LO-4162. Thus, the advantages of the Mason apparatus and method are also attainable while utilizing my invention.

Furthermore, still more precisely controlled and reliable operation results by utilizing the constant force mechanisms as previously described herein. These constant force mechanisms, when utilized, provide a significant improvement in the overall reliability and accuracy of operation of the apparatus 20 as compared with the expected reliability and accuracy that would result if only coil or other variable force springs were used for urging the follower mechanisms 57, 62 against the camming surfaces of cams 56, 57; and for urging the members 78, 79, 80 downwardly against a forming and inserting tool 102.

Various other features that are also useful in providing continued reliability and accuracy of the apparatus 20 include the provision of means for positively displacing the rocker arm 112 and carriage block 111. As will be understood, this means may include the surface cams 126, 124 which, by having spaced apart congruent camming surfaces, provide compensating forces through the linkages 127, 128 that do not vary with displacement of the arm 112 and block 111. The constant force mechanisms will, of course, also be of utility even when cams 56 and 57 are replaced in preparation for utilizing the apparatus with a core other than the core 100. Still another portion of the apparatus 20 should also be mentioned as having an affect on reliability and accuracy of operation. More specifically the drive train, including the shafting and gearing should be designed to provide maintenance free operation. For example, the end play of shafts C and D should be controlled with care, through adequate bearings, since undue shaft end play would permit the arm 167 of the Geneva mechanism on shaft D to interfere with the Geneva part 138 and this in turn would literally break either or both of shafts C and D, as well as jam and break the Geneva mechanism.

Now having reference to FIGS. 5 and 8–11, the formation of slot liners for slots such as slots S2 and S6 will be described in order to more fully explain the operation of the improved forming mechanism 47.

It first is again noted that in the exemplified apparatus, a separate forming and insertion tool or blade is provided on the tooling support tube for each of the slots S1 through S9. The insulator forming portions of two of these blades, 203 and 204, have been shown in FIGS. 9 and 10 respectively. The blade 203 is utilized during formation and placement of an insulator 206 for a slot like slot S6, and an insulator 207 for slot S2 is formed with blade 204.

The component parts of the mechanism 47 are most readily appreciated by first comparing FIGS. 1 and 8 and the structure shown therein. The head platen 50 is, as previously described, supported for vertical movement on a pair of pull rods. Secured to platen 50 by any suitable means, such as by bar 208 and a stud 209 at each end thereof, is a tee bar 211. Fastened to tee bar 211, e.g., by screws 212, are a pair of spaced apart side plates 83, 84, and each of these are provided with four slots. Two slots 214 in each of the side plates each slidably accommodate pins 216 carried by inner pressure bar 78. The other two slots 217 in each side plate slidably accommodate pins 218 that are carried by the outer pressure bars 79, 80.

The outer pressure bars 79, 80, will slide relative to the side plates 83, 85, but are normally biased by a constant force to an extreme position as shown in FIG. 1. This constant force, is determined by the setting of value 168 on air tank 75, and is applied through cylinder 72 to rocker assembly 77 and then, through plungers 85, 90, to the two pressure bars 79, 80, against which the plungers bear. With the illustrated arrangement, the force applied to and by the pressure bars 79, 80 is independent of the position of those bars relative to plates 83, 84 but may be varied as desired by adjusting valve 168.

Similarly, the valve 169 controls the force applied through cylinder 171, rocker assembly 76 and plungers 81, 82 to inner pressure bar 78. Since the plungers freely pass through openings in the bars 79, 80, and the bar 78 is slidable relative to the bars 79, 80, the bar 78 will normally urge the pins 216 carried thereby to the lower extremities of slots 221 formed in the outer pressure bars as shown in FIG. 8.

Figure 9:
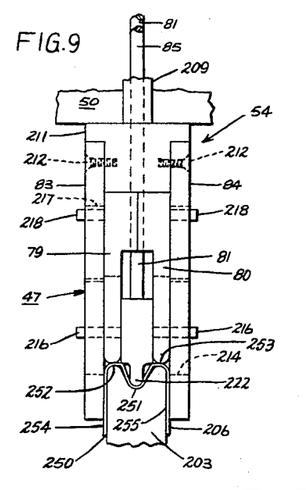
FIG. 9 is an enlarged front elevational view showing the cooperation of the FIG. 8 structure with a forming and inserting tool.

During operation of the apparatus, while the cam followers on the linkage 127 dwell in the grooves formed by the congruent camming surfaces of the cams 126, 124; the tool 203 is positioned as shown in FIG. 9, a strip 250 of material to be used in forming insulator 206 is positioned across the tool 203 and severed. Since the precise or dwell position of the stop plate and severing head 46 are precisely controlled, it will be appreciated that the length of strip 250 will be precisely determined.

Then the platen 50 moves through its fixed increment of travel toward the tool 203. Just as this travel commences, the tip 222 of pressure member or bar 78 will engage and press or force the central region 251 of the strip of material against the upper surface of the tool 203 and, shortly thereafter, the lower edges of pressure members or bars 79, 80 will press or force the spaced apart regions 252, 253 of strip 250 against the upper edges of the tool 203, as viewed in FIG. 9.

As the platen 50 continues to move, the side plates 83, 84 will form the legs 254, 255 of the insulator 206 against the vertical sides of the tool 203, while the pressure bars remain stationary. During this last interval, relative movement occurs between the pressure bars and side plates with the pins 216, 218 being freely slidable relative to the slots 214, 217.

Then, after the insulator is disposed in a slot S6 by the tool 203, the platen 50 raises, and another tool is indexed into position under the platen.

Figure 10:
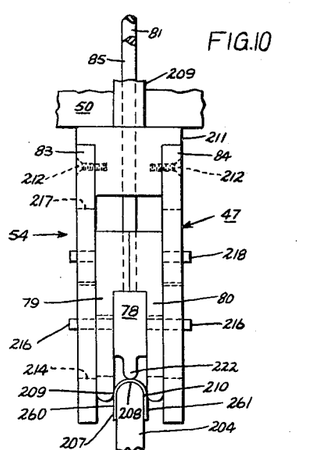
FIG. 10 is an enlarged front elevational view showing the cooperation of the FIG. 8 structure with still another forming and inserting tool.
Figure 11:
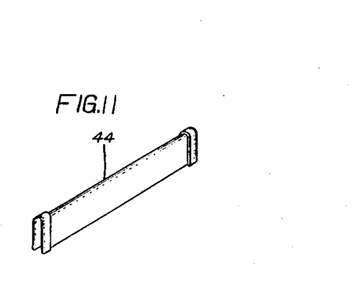
FIG. 11 is a view of a formed slot insulator after being formed according to the FIG. 10 illustration.

Now turning to FIG. 10, it will be understood that, during formation of insulator 207, the pins 216 will ride upwardly (relatively speaking) in the slots 221 as well as slots 214 while the outer pressure bars force the legs 260, 261 of the insulator relative to the tool 204. Thus, for this insulator 207, only pressure bar 78 will bear, through the insulator 207, against the tool 204. Thus, the bar 78 will force region 208 against the tool 204 while bars force spaced apart regions 209, 210 relative to the tool.

From the foregoing, it should now be appreciated that, substantially any type of insulators, including phase insulation, slot closure insulators, slot liners, and the like, may be much more accurately formed than heretofore. Moreover, the forming means 54 are selectively self-compensating for the size and shape of each individual tool positioned for cooperation therewith. It should also be appreciated that separate plungers could be used for each of the pressure bars 79, 80 and that one outer pressure bar could be then operated as a holding means, while the other outer pressure bar could be utilized as forming means for forming one leg of an insulator. In this event, only one of the side plates would then be used as a forming means for forming the other leg of the particular insulator or slot liner.

One of the added benefits of utilizing pre-adjustable constant force applying means should also now be appreciated. For example, even when the exemplified pressure bars are not utilized, various thicknesses of strip insulation may require the use of a greater or lesser force. However, while it is desirable to tightly grip the material, it will be damaged if over-stressed. With the exemplified constant force means, each of the forces applied through the pressure members may be independently adjusted for optimum performance. Thereafter they will remain constant. Thus, a problem of having variable forces applied to successive insulators (because of the different dimensions of successive tools and thus pressure bar travel) is avoided. Also of benefit is the fact that the fatigue problems associated with conventional steel springs may, if desired, now be avoided.

Figure 6:
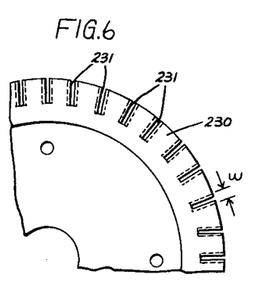
FIG. 6 is an elevational view, with parts broken away, of a modified guide ring for the apparatus shown in FIG. 1.

Turning now to FIGS. 6 and 7, a modified guide ring 230 will be described that may be utilized to advantage in lieu of the guide ring 107 illustrated in FIG. 1. Although it is not readily apparent from FIG. 1, the blade passages formed in the guide ring 107 are tapered or funnel shaped, and become increasingly constrictive as an insertion tool passes therethrough while advancing toward the slot of a core. This tapered passage arrangement has been previously provided in order to gather the legs of a slot liner against the sides of the tool as it moves away from the influence of the side plates in the insulator forming head.

In addition, it has previously been considered to be necessary to shape each passage through the guide ring so that it would generally conform with the slot of the core that was to be aligned therewith. It will be appreciated that the tooling and machining of ring 107 would thus represent a relatively large investment. I have now found, however, that even in the case of stator 100, a relatively inexpensive guide ring (as shown for example at 230 in FIGS. 6 and 7) may be utilized. The guide ring 230 is formed with identical passages 231 therein as illustrated. Of course, these passages are arranged for general alignment with the unrestricted portions of the slots S1–S9 of the core. I have found that the width w of each of these slots may be made just slightly smaller than the width of the most narrow core slot to be used therewith. In the case of core 100, this would be the slot S1. This in turn results in still greater economies, since all of the tooling blades may be made to have uniform base positions, i.e., uniform cross sections for the portion of the tool that is to pass through the passages 231. by utilizing standard base cross sections, less fabrication expense should be involved since fabrication would then more readily be susceptible of mass production techniques. Also, less material would be used, resulting both in material cost savings and reduced inertial forces during operation of the apparatus.

It should now be appreciated that constant force mechanisms are advantageously utilized to assist in precisely determining selected ones of different dwell positions for the strip material stop means as well as the strip material severing means, which are disposed at spaced apart general locations. Furthermore one or more constant force mechanisms may be used in connection with insulator fabricating means comprising one or more pressure members. By this approach, together with selectively varying the stiffness of the spring assembly of the accumulator means, as by changing the number or size of springs therein varying widths of insulating material having variable stiffness will easily be accommodated by the apparatus 20 without being overstressed and damaged. Furthermore, the insulators so formed may be placed on or in whatever inductive device, including a stator core, is being handled with the apparatus 20.

It will now be understood (my invention having been completely described in connection with a preferred and modified exemplification) that apparatus embodying and utilized in the practice of the invention may be quickly set up to handle different stator cores within a very short period of time. For example, in the apparatus 20, the forming and inserting tools 102 may be readily interchanged with forming and inserting tools of other configurations; and most, if not all, of the gears that would be changed in order to control the relative amounts and direction of rotation of the shafting are readily accessible at the rear of the apparatus. Furthermore, the constant force applying mechanisms may readily be adjusted as desired for different insulator materials, material configurations, and thicknesses.

Therefore, while in accordance with the Patent Statutes, I have described what at present are considered to be the preferred forms of the invention it will be obvious to those skilled in the art that numerous changes and modifications may be made therein without departing from the true spirit and scope of the invention, and it is therefore aimed in the following claims to cover all such modifications.

What I claim as new and desire to secure by Letters Patent of the United States is:

1. Apparatus for developing from strip material an insulator having a desired configuration in a preselected slot of a magnetic core, the apparatus comprising: first means for restraining movement of at least a portion of the strip material, said first means being disposed at a first general location, said first means being selectively movable between different dwell positions and including a first constant force mechanism for assisting in precisely determining selected ones of the different dwell positions of the first means; second means mounted in spaced relation to the first means at a second general location for severing the strip material, said second means being selectively movable between different dwell positions and including a second constant force mechanism for assisting in precisely determining selected ones of the different dwell positions of the second means where the strip material is severed to provide a piece of electrically insulating strip material having a preselected length as measured between predetermined dwell positions of the first and second means; third means cooperating with the first and second constant force mechanisms for establishing the respective dwell positions of the first and second means whereby pieces of strip material of different preselected lengths may be severed thereby to permit fabrication of insulators of differing desired configurations; and fourth means mounted in communication with a location between the first and second general locations for establishing the desired configuration of the piece of strip material.

2. The apparatus of claim 1 wherein the fourth means includes a third constant force mechanism effective during operation to assist in accurately attaining desired insulator configurations.

3. The apparatus of claim 2 further including at least one insulator forming tool; and wherein the fourth means includes at least one pressure member movable relative to the insulator forming tool and the at least one pressure member is urged toward the insulator forming tool by the third constant force mechanism.

4. The apparatus of claim 1 further including at least one insulator forming tool; and wherein the fourth means includes a carriage and at least two members mounted for movement relative to one another and the carriage; said fourth means further including at least one constant force mechanism cooperating with at least one of said two members for urging the at least one of said two members toward the forming tool during formation of an insulator from a piece of strip material.

5. The apparatus of claim 4 wherein said at least one of said two members forces a first region of the piece of strip material against the forming tool and the other of said two members forces second and third regions of the piece of strip material against the forming tool to produce an insulator of a desired configuration.

* * * * *

PO-1050
(5/69)

UNITED STATES PATENT OFFICE
CERTIFICATE OF CORRECTION

Patent No. 3,703,854          Dated November 28, 1972

Inventor(s)    Leo M. Schlaudroff

It is certified that error appears in the above-identified patent and that said Letters Patent are hereby corrected as shown below:

Change item [45] (the issue date appearing in the upper right hand corner of the title page) to read --Nov. 28, 1972--.

In column 1, line 19, after "of" insert --a--.

In column 2, line 64, change "action" to --acting--.

In column 3, line 18, change "different" to --differing--.

In column 4, line 19, change "references" to --reference--.

In column 4, line 44, change "spring" to --springs--.

In column 5, line 44, change "This" to --Thus--.

In column 7, line 21, change "36" to --thirty-six--.

In column 7, line 41, change "36" to --thirty-six--.

In column 8, line 16, delete ")" parenthesis after "blades".

In column 8, line 32, after "angle" insert --&--.

In column 8, line 38, change "36" to --thirty-six--.

In column 9, line 53, change "preceeding" to --preceding--.

In column 9, line 60, change "moved" to --moving--.

In column 11, line 67, after "through" add --an--.

Signed and sealed this 2nd day of April 1974.

(SEAL)
Attest:

EDWARD M. FLETCHER, JR.          C. MARSHALL DANN
Attesting Officer                Commissioner of Patents